United States Patent [19]

Hoffmann

[11] Patent Number: 4,645,098

[45] Date of Patent: Feb. 24, 1987

[54] PRESS-OUT PISTON FOR DISPENSING SUBSTANCE FROM A CONTAINER

[75] Inventor: Armin Hoffmann, Germering, Fed. Rep. of Germany

[73] Assignee: Hilti Aktiengesellschaft, Fürstentum, Liechtenstein

[21] Appl. No.: 701,968

[22] Filed: Feb. 15, 1985

[30] Foreign Application Priority Data

Feb. 16, 1984 [DE] Fed. Rep. of Germany ....... 3405547

[51] Int. Cl.$^4$ .......................... B67D 5/42; G01F 11/00
[52] U.S. Cl. .................................... 222/386; 222/386.5
[58] Field of Search ..................... 222/386, 386.5, 387, 222/388, 389, 390, 391

[56] References Cited

U.S. PATENT DOCUMENTS

| | | | |
|---|---|---|---|
| 2,809,774 | 10/1957 | Kaye et al. ..................... | 222/387 X |
| 2,933,221 | 4/1960 | Rand et al. ........................... | 222/391 |
| 3,381,863 | 5/1968 | Towns .............................. | 222/386.5 |
| 4,197,967 | 4/1980 | Baur et al. ...................... | 222/386 X |

Primary Examiner—Joseph J. Rolla
Assistant Examiner—Jay I. Alexander
Attorney, Agent, or Firm—Toren, McGeady and Goldberg

[57] ABSTRACT

A press-out piston is movably displaceable through an axially extending container holding a flowable plastic substance for dispensing the substance as the piston is forced through the container. The radially outer circumference of the piston has an annular groove in which an elastically deformable sealing ring is positioned. The base of the groove is conically shaped about the axis of the container and diverges outwardly toward the rear end of the container. When the piston is pressed toward the front end of the container for dispensing the substance, the sealing ring is moved axially relative to the piston and is pressed radially outwardly against the inside surface of the container. As a result, the seal for the piston is dependent on the pressure directed against the substance for dispensing it out of the container.

8 Claims, 3 Drawing Figures

PRESS-OUT PISTON FOR DISPENSING SUBSTANCE FROM A CONTAINER

BACKGROUND OF THE INVENTION

The present invention is directed to a press-out piston for dispensing a flowable plastic substance from a cylindrical container with the piston having an annular groove in its outer circumferential surface.

Containers with press-out pistons for forcing a plastic substance out of a container are usually used only once and simultaneously serve as a packing and, together with a corresponding pressure applying device, as a dispensing apparatus for determined amounts of the substance. For reasons of cost, the container and the press-out piston are produced from plastics material. Considerable force is required, based on the viscosity of the substance being dispensed, for forcing the substance out of the container. Accordingly, high pressure is exerted by the substance on the piston and also on the container wall. Due to the pressure acting on the container wall, the container tends to expand radially so that a certain amount of radial play develops between the press-out piston and the container. Such radial play can form an annular gap through which a part of the substance being dispensed can escape out of the rear end of the container opposite to the direction in which the substance is dispensed. If such substance leaks out of the rear end of the container it can interfere with the proper dispensing of the substance and can result in interruptions in the dispensing operation for short or long periods of time.

In known press-out pistons a variety of means have been used to prevent the substance from escaping out of the container, for instance, radially resilient sealing lips, pressure compensation grooves and the like have been utilized. Other press-out pistons have been widened radially through the deformation of the piston head. These various means have been either too costly or have not provided a sufficient sealing effect.

SUMMARY OF THE INVENTION

Therefore, the primary object of the present invention is to provide a press-out piston for use in containers holding a flowable plastic substance with the piston affording a sufficient sealing effect with the container wall and, in addition, permitting the actuation or displacement of the piston with limited dispensing forces.

In accordance with the present invention, an elastically deformable sealing ring is provided with an annular groove around its outside circumference with the base of the groove diverging outwardly toward the rear end of the container, in other words, the depth of the groove decreases in the direction opposite to the pressing out or dispensing direction.

The elastically deformable sealing ring adapts to the inside diameter of the container. Due to friction between the sealing ring and the inside wall of the container and the pressure acting on the substance in the container, the sealing ring is displaced axially relative to the press-out piston in the direction opposite to the movement of the piston toward the front end of the container. The sealing ring is pressed radially outwardly against the inside wall of the container due to the conical shape of the base of the groove the depth of which decreases toward the rear end of the container, that is, in the direction opposite to the direction in which the piston is forced toward the front end of the container.

To facilitate displacement of the sealing ring in the annular groove and, accordingly, to radially widen the sealing ring, it is preferable if the base of the annular groove widens conically opposite to the direction in which the piston is forced through the container. Such conical widening prevents any projections which could tend to damage the sealing ring. Accordingly, the radial widening of the sealing ring is achieved practically proportionally to the increasing pressure acting on the substance being dispensed.

To prevent the sealing ring from being jammed in the annular groove, it is advantageous if a stop shoulder adjoins the rear end of the base in the groove, that is, the end of the groove in the axial direction which is more remote from the front end of the container. Advantageously, such a stop shoulder can extend perpendicularly relative to the axis of the piston and the axis of the container. If the sealing ring is correspondingly shaped, the stop shoulder can be inclined in one direction or the other. It is particularly important that the annular gap remaining between the outside diameter of the stop shoulder and the inside diameter of the container be as small as possible.

The introduction of the press-out piston into the rear end of the container should not be impeded by the sealing ring, if possible. Accordingly, the sealing ring should be located during such introduction so that it does not project radially outwardly from the outside circumferentially extending surface of the piston. To assure this feature, the annular groove must be dimensioned so that its dimension in the axial direction of the container is sufficient to avoid any outward projection of the sealing ring. Therefore, it is advantageous if the dimension of the annular groove in the axial direction is approximately twice the maximum depth of the groove inwardly from the circumferential surface of the piston. The dimension of the sealing ring corresponding to the dimension of the groove extending in the axial direction of the container is preferably about 0.5 to 0.8 times the groove dimension in the axial direction.

The depth of the annular groove is also dependent on the shape of the sealing ring. It is preferable if the maximum depth of the annular groove is approximately twice its minimum depth. The minimum depth of the groove is preferably smaller than the radial dimension of the sealing ring and the maximum depth of the groove is larger than the radial dimension of the sealing ring.

Generally speaking, sealing rings of different materials and different form can be used. For example, it is possible to use commercially available O-rings. With such rings, however, there is the danger that they will be pressed into the annular gap between the press-out piston and the inside wall of the container and thus become damaged. To avoid such a situation, advantageously the sealing ring has a quadrangular cross section in the undeformed state. The cross section may be quadratic, rectangular or trapezoidal. The material forming the sealing ring may be softer or harder based on the viscosity of the substance being dispensed.

The various features of novelty which characterize the invention are pointed out with particularity in the claims annexed to and forming a part of this disclosure. For a better understanding of the invention, its operating advantages and specific objects attained by its use, reference should be had to the accompanying drawings

DETAILED DESCRIPTION OF THE INVENTION

Figure 1:
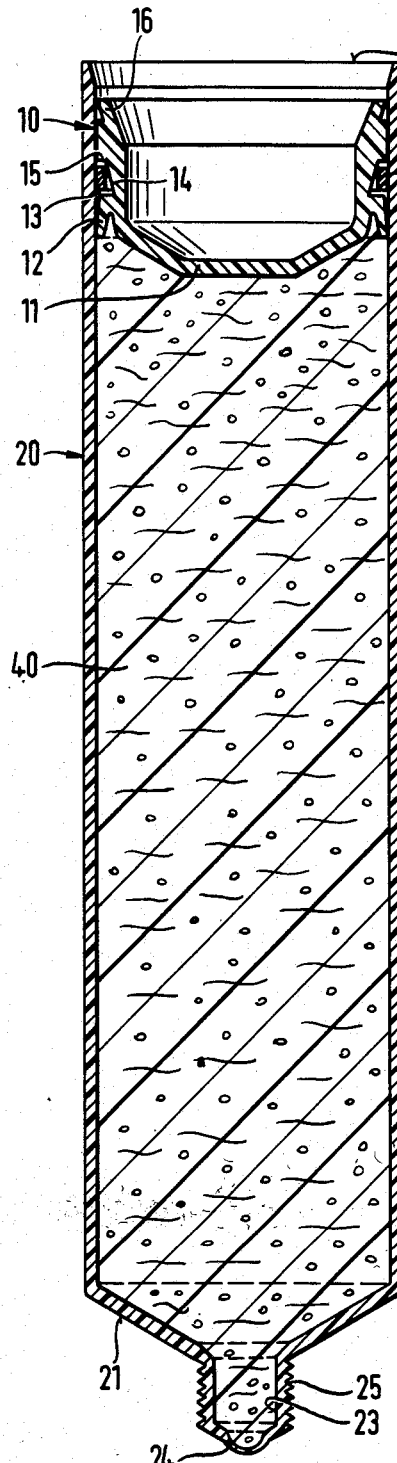
FIG. 1 is an axially extending cross-sectional view of a container with a press-out piston inserted into the rear end of the container without any pressure exerted on the substance in the container, in accordance with the present invention.
Figure 2:
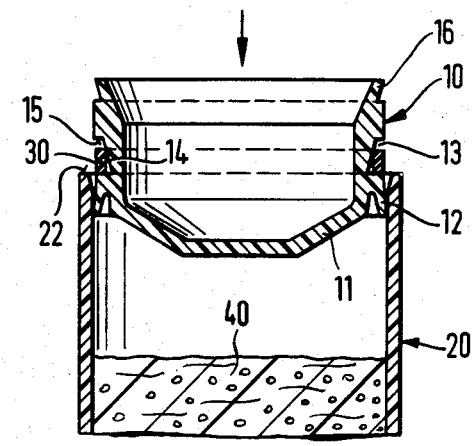
FIG. 2 is a partial view, similar to FIG. 1, illustrating the introduction of the press-out piston into the container.
Figure 3:
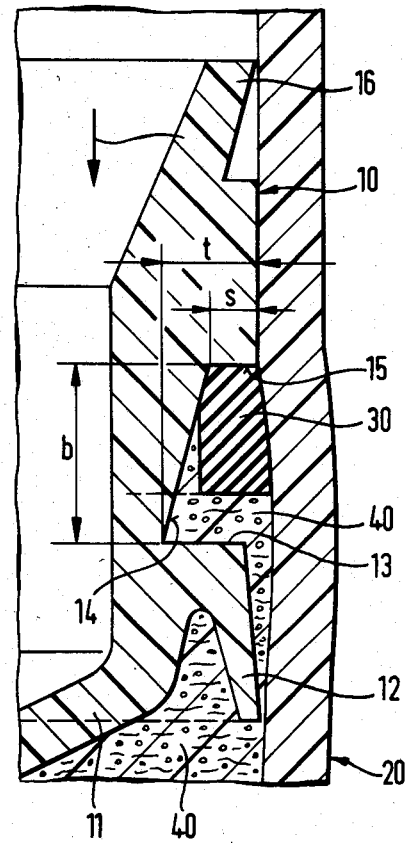
FIG. 3 is an enlarged detail view of a section of the press-out piston and container with the substance within the container under pressure.

A press-out piston is illustrated in FIGS. 1, 2 and 3. The piston 10 and the cylindrical container 20 in which it is located each have a front end and a rear end and as viewed in FIG. 1 the lower end is the front end and the upper end is the rear end. The piston 10 has a head 11 of a generally convex shape on its outside surface directed downwardly against the substance 40 within the container 20. The substance 40 is pressed out or dispensed through the front end of the container with the generally convex surface of the head 11 of the piston 10 pressurizing the substance in the dispensing operation. In addition to the head 11, the piston 10 has a sleeve-like portion extending from the radially outer edge of the head to the rear end of the piston. The front end of the sleeve-like part has a radially resilient sealing lip 12. Following the lip 12 in the direction toward the rear end is an annular groove extending around the radially outer surface of the piston and containing an elastically deformable sealing ring 30. A generally cylindrically shaped radially outer surface section extends from the annular groove toward the rear end of the piston. As can be seen best in FIG. 3, the radial depth of the groove 13 decreases in the direction toward the rear end of the piston. The reduction in the radial dimension of the groove is provided by shaping the base of the groove in a conical manner so that the base diverges from the axis of the piston or container toward the rear end of the piston. In other words, the base of the groove diverges outwardly in the direction opposite to the direction in which the substance is pressed out of the container. The rear end of the groove forms a stop shoulder 15 for the sealing ring and the stop shoulder extends approximately perpendicularly to the axis of the piston 10 and extends radially outwardly from the rear end of the groove 13, that is, the end having the larger conical diameter. Rearwardly from the shoulder 15, the piston 10 has a sealing rim 16 at its rear end. The radially inner and outer surfaces of the rim 16 diverge outwardly in the direction toward the rear end.

The cylindrical container 20 has a front end 21 and a rear end 22 spaced apart in the axial direction of the container. The substance is pressed out or dispensed from the front end 21 so that the pressing direction of the piston is in the downward direction toward the front end 21 as viewed in FIG. 1. Container 20 has a dispensing opening 23 at its front end which is closed by a diaphragm 24 in FIG. 1. The front end of the container necks down from the outside surface of the container to the generally cylindrically shaped dispensing opening 23. In use, a dispensing nozzle is attached onto the front end 21 of the container and is screwed onto a thread 25 on the outside surface of the dispensing opening 23 after the diaphragm 24 has been removed from the opening. As shown in FIG. 1 the interior of the container is filled with a flowable plastic substance 40 between the piston 10 and the front end 21 of the container.

As shown in FIG. 1, the substance 40 is in the unpressurized state, and the sealing ring 30 is located approximately in the central region of the annular groove 13, that is, spaced from the front end and the rear end of the groove. In this position, the sealing ring lightly contacts the inside surface of the container 20. In this condition, the press-out piston 10 can be displaced toward the front end 21 without much effort.

In FIG. 2 the press-out piston 10 is shown being inserted into the rear end 22 of the container 20. The inside surface of the container at the rear end is conically shaped diverging outwardly to the rear end so that the piston can be easily inserted. The sealing ring 30 is positioned at the front end of the annular groove 13. In this position, the sealing ring is located within the groove and does not project outwardly from the circumferential surface of the press-out piston 10 so that the piston can be easily inserted into the rear end of the container with the displacement of any air which may be present in the rear end of the container. As the piston is inserted, the resilient sealing lip 12 takes over the sealing function.

In the enlarged partial sectional view in FIG. 3, the press-out piston is displaced from the position shown in FIG. 1 toward the front end of the container for dispensing the substance 40. Substance 40 has penetrated around the sealing lip 12 into the annular groove 13 and acts in the axial direction on the sealing ring and pushes the ring rearwardly against the stop shoulder 15. Since the radial depth s at the rear end of the annular groove 13 is smaller than the maximum depth t at the front end of the annular groove, the sealing ring pressed along the base of the groove is radially widened and forced outwardly against the inside surface of the container 20. The axial dimension b of the groove 13, that is, the dimension extending in the front end-rear end direction, is approximately twice the maximum radial depth t of the annular groove 13. If the pressure acting on the substance 40 is released, the sealing ring rebounds and returns approximately to the rest position shown in FIG. 1. In the rest position or the undeformed state, the sealing ring is approximately rectangular in cross-section, note FIG. 1. Due to this configuration of the sealing ring, it is pressed radially outwardly against the inside surface of the container at its rear end due to the inclined arrangement of the base 14 of the annular groove 13. In the front region of the sealing ring 30, the substance 40 can also press the sealing ring against the inside surface of the container 20.

While specific embodiments of the invention has been shown and described in detail to illustrate the application of the inventive principles, it will be understood that the invention may be embodied otherwise without departing from such principles.

I claim:

1. Press-out piston for insertion into an axially extending cylindrically shaped container having an inner surface and an outer surface and a front end and a rear end with said piston arranged for displacing a flowable plastic substance out of the front end of the container, said piston having a front end and a rear end with a head forming the front end and arranged to extend transversely across the inside of the container for applying pressure to the substance to be displaced out of the container and to be axially slidably insertable into the rear end of said container and to be axially slidably displaceable from the rear end toward the front end of said container for displacing the plastic substance, an annular wall extending from the outer circumferential periphery of said head toward the rear end and having a first end at said head and a second end at said rear end, said annular wall having a radially outer surface and a radially inner surface, an annular groove formed in the radially outer surface with said groove spaced from the front end and rear end of said piston, wherein the improvement comprises said piston having an axis extending in the front end-rear end direction, said radially outer surface of said annular wall has a generally cylindrically shaped surface section intermediate the first and second ends of said annular wall and extending in the axial direction of said piston from said annular groove toward the rear end of said piston, an elastically deformable sealing ring positioned within said annular groove and having a radially inner surface and a radially outer surface, said annular groove having a base extending in the front end-rear end direction from a first end closer to the front end of said piston and a second end more remote from the front end of said piston and with the depth of the groove from said surface section decreasing in the front end toward the rear end direction, said first and second ends of said annular groove extending transversely of the front end-rear end direction of said piston, said sealing ring in the undeformed state has a quadrangular cross section, said annular wall includes a radially resilient sealing lip at the first end of said annular wall arranged to contact the inside of the container when said piston is inserted into the container, said sealing lip located on the first end side of said annular groove and having a radially inner surface and a radially outer surface extending generally in the axial direction of said piston with the radially outer surface diverging outwardly from the front end side of said annular groove toward the front end of said head, the radially inner surface of said sealing lip diverging outwardly from adjacent the front end side of said annular groove toward the front end of said head and being spaced radially outwardly from the front end of said head, said annular groove located toward the rear end of said piston from said sealing lip, and an annular sealing rim located between said surface section and the rear end of said piston and forming the rear end of said annular wall, said sealing rim has a radially inner surface and a radially outer surface each inclined at an angle relative to the axis of the container and inclined outwardly toward the rear end of said piston, the radially outer surface of said sealing rim said cylindrically shaped surface section and the radially outer surface of said sealing ring being dimensioned to contact the inner surface of said container when said piston is inserted into the rear end of said container without applying pressure to the plastic substance, said sealing lip at the end thereof spaced more remotely from said annular groove is arranged to bear against the inner surface of said container when said piston is inserted into the rear end of said container without applying pressure to the plastic substance, said container being radially outwardly displaceable in the region of the front end of said piston when pressure is applied to said piston displacing the plastic substance out of said container whereby said sealing lip separates from the inner surface of said container and the pressurized plastic substance flows between the sealing lip and the inner surface of said container into contact with said sealing ring for pressing said sealing ring within said annular groove radially outwardly and toward the second end of said annular groove.

2. Press-out piston, according to claim 1, wherein the base of said annular groove in the axial direction of said piston widens conically relative to said piston axis toward the rear end of said piston.

3. Press-out piston, as set forth in claim 2, wherein a stop shoulder extends transversely of the front end-rear end direction of said piston and is located at the second end of said groove.

4. Press-out piston, as set forth in claim 1, 2 or 3, wherein the dimension b of said annular groove in the front end-rear end direction of said piston is approximately twice the maximum depth t of said groove in the radial direction thereof.

5. Press-out piston, as set forth in claim 4, wherein said maximum depth t of said annular groove in the radial direction thereof is approximately twice the minimum depth s of said annular groove in the radial direction thereof.

6. Press-out piston, as set forth in claim 1, wherein the surface of the front end of said piston head arranged to face and contact the substance within the container has a generally convex shape.

7. Press-out piston, as set forth in claim 1, wherein said sealing ring in the undeformed state has the radially inner surface and the radially outer surface thereof extending generally parallel to the axis of said piston and the radially inner surface of said sealing ring having a greater diameter than the smaller diameter of said annular groove and the radially outer surface of said sealing ring having a diameter not greater than the outside diameter of said surface section of said piston at the end of said annular groove closer to the front end of said piston.

8. Press-out piston, as set forth in claim 3, wherein said stop shoulder extends perpendicularly of the axis of said piston.

* * * * *